United States Patent
Wang et al.

(10) Patent No.: US 12,197,532 B2
(45) Date of Patent: Jan. 14, 2025

(54) METHOD AND APPARATUS FOR NEURAL NETWORK OPTIMIZED MATRIX-MATRIX MULTIPLICATION (NNMM)

(71) Applicant: TENCENT AMERICA LLC, Palo Alto, CA (US)

(72) Inventors: Wei Wang, Palo Alto, CA (US); Wei Jiang, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 1014 days.

(21) Appl. No.: 17/092,925

(22) Filed: Nov. 9, 2020

(65) Prior Publication Data

US 2021/0264239 A1 Aug. 26, 2021

Related U.S. Application Data

(60) Provisional application No. 62/979,034, filed on Feb. 20, 2020.

(51) Int. Cl.
| | | |
|---|---|---|
| G06F 17/16 | (2006.01) | |
| G06F 18/214 | (2023.01) | |
| G06N 3/04 | (2023.01) | |
| G06N 3/063 | (2023.01) | |

(52) U.S. Cl.
CPC ............ G06F 17/16 (2013.01); G06F 18/214 (2023.01); G06N 3/04 (2013.01); G06N 3/063 (2013.01)

(58) Field of Classification Search
None
See application file for complete search history.

(56) References Cited

U.S. PATENT DOCUMENTS

| | | | | |
|---|---|---|---|---|
| 11,496,775 B2* | 11/2022 | Jiang | ................ | H04N 19/96 |
| 2019/0230354 A1* | 7/2019 | Kim | ................ | H04N 19/82 |
| 2021/0019630 A1* | 1/2021 | Yao | ................ | G06N 3/045 |
| 2021/0125071 A1* | 4/2021 | Ren | ................ | G06N 3/04 |
| 2021/0264239 A1* | 8/2021 | Wang | ................ | G06F 17/16 |
| 2022/0335272 A1* | 10/2022 | Elsen | ................ | G06F 17/16 |

FOREIGN PATENT DOCUMENTS

CN 107402905 A 11/2017

OTHER PUBLICATIONS

Kazushige Goto et al., "Anatomy of High-Performance Matrix Multiplication", ACM Transactions on Mathematical Software, May 2008, pp. 1-25, vol. V, No. N.

* cited by examiner

Primary Examiner — Haimei Jiang
(74) Attorney, Agent, or Firm — Sughrue Mion, PLLC (57) ABSTRACT

According to embodiments, a method of neural network optimized matrix-matrix multiplication (NNMM) is performed by at least one processor and includes determining a first matrix of input coefficients, and determining a second matrix of weight coefficients of a neural network that is trained so that the second matrix has a predetermined uniform pattern, the predetermined uniform pattern having at least two of the weight coefficients that have a same value. The method further includes performing multiplication of the determined first matrix and the determined second matrix to determine output coefficients.

17 Claims, 9 Drawing Sheets

FIG. 1A

Registers

L1 cache

L2 cache

L3 cache

METHOD AND APPARATUS FOR NEURAL NETWORK OPTIMIZED MATRIX-MATRIX MULTIPLICATION (NNMM)

CROSS-REFERENCE TO RELATED APPLICATION

This application claims priority from U.S. Provisional Patent Application No. 62/979,034, filed on Feb. 20, 2020, the disclosure of which is incorporated herein by reference in its entirety.

BACKGROUND

Deep Neural Networks (DNNs) have achieved great success in solving a wide range of tasks for computer vision, natural language processing, etc. The large model capacity of the deep network structures with a huge number of parameters leads to high prediction performance, but also makes DNN models too expensive to use in practice, especially for mobile and on-device applications with strong limitations on storage, computation power, and energy consumption. It has drawn great attention how to reduce the costs of using DNNs in academia and industry. A special group is also formed by the international standardization organization MPEG addressing this issue.

SUMMARY

According to embodiments, a method of neural network optimized matrix-matrix multiplication (NNMM) is performed by at least one processor and includes determining a first matrix of input coefficients, and determining a second matrix of weight coefficients of a neural network that is trained so that the second matrix has a predetermined uniform pattern, the predetermined uniform pattern having at least two of the weight coefficients that have a same value. The method further includes performing multiplication of the determined first matrix and the determined second matrix to determine output coefficients.

An apparatus for NNMM, includes at least one memory configured to store program code, and at least one processor configured to read the program code and operate as instructed by the program code, the program code including first determining code configured to cause the at least one processor to determine a first matrix of input coefficients, and second determining code configured to cause the at least one processor to determine a second matrix of weight coefficients of a neural network that is trained so that the second matrix has a predetermined uniform pattern, the predetermined uniform pattern having at least two of the weight coefficients that have a same value. The program code further includes performing code configured to cause the at least one processor to perform multiplication of the determined first matrix and the determined second matrix to determine output coefficients.

A non-transitory computer-readable medium stores instructions that, when executed by at least one processor for NNMM, cause the at least one processor to determine a first matrix of input coefficients, and determine a second matrix of weight coefficients of a neural network that is trained so that the second matrix has a predetermined uniform pattern, the predetermined uniform pattern having at least two of the weight coefficients that have a same value. The instructions, when executed by the at least one processor, further cause the at least one processor to perform multiplication of the determined first matrix and the determined second matrix to determine output coefficients.

DETAILED DESCRIPTION

This disclosure is related to neural network model acceleration. To be more specific, a method is related to a uniform pattern based general matrix-matrix multiplication (GEMM) operation for neural network model acceleration.

Inference operation for deep learning system uses matrix multiplication intensively, so high-performance GEMM is the key for inference operation. Depending on the size of a left-hand-side (lhs) matrix and a right-hand-side (rhs) matrix, two GEMM routines (GEPP/GEBP, GEPM/GEBP) are recognized by the industry over the last decade as the optimal GEMM solution. Both methods partition an lhs matrix and an rhs matrix recursively to make the best use of different characteristics of off-chip memory (such as DDR) and on-chip memory (such as multi-level cache) in modern computing platform.

Figure 1A:
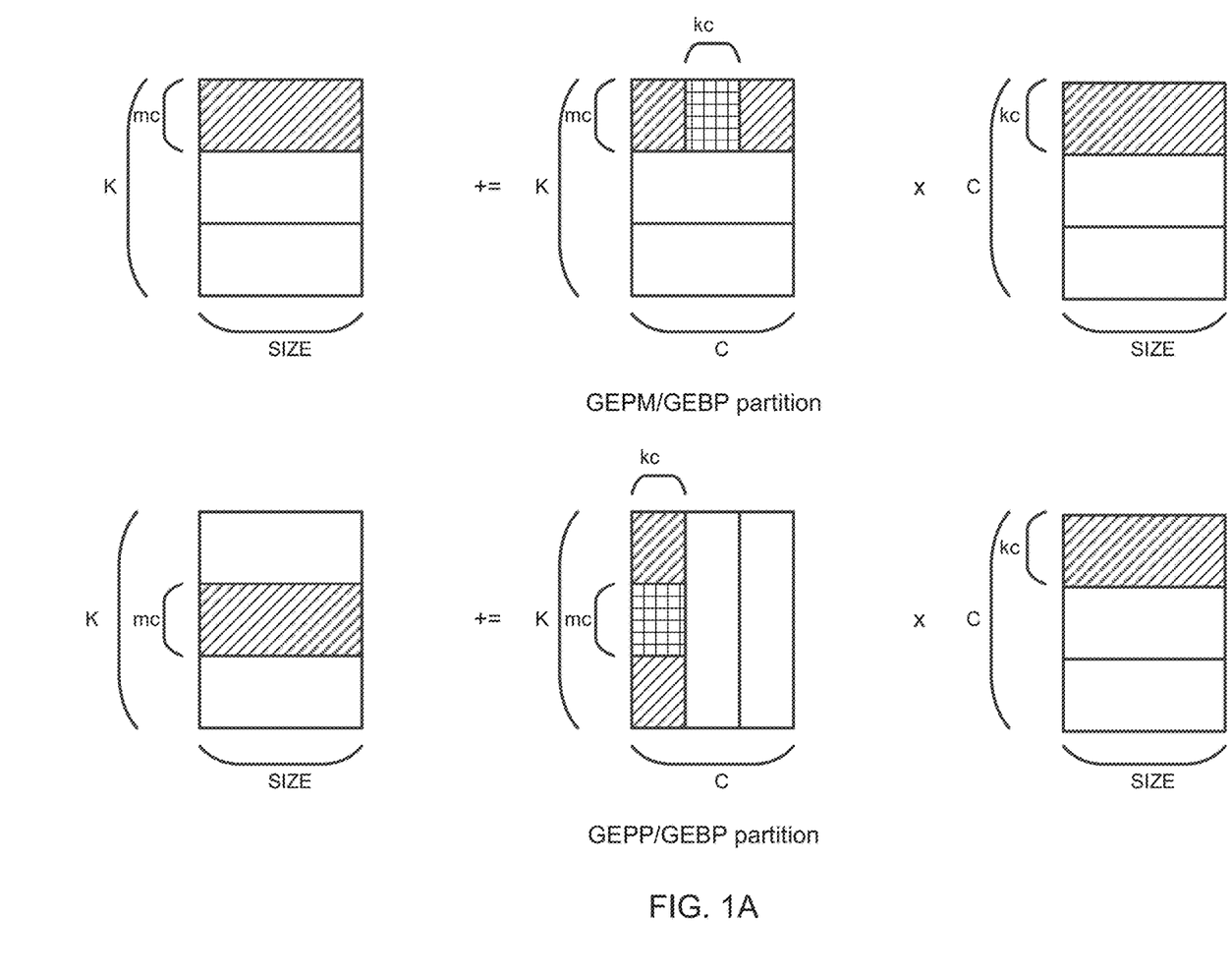
FIG. 1A is a diagram of a general panel-matrix multiplication (GEPM)/general block-panel multiplication (GEBP) partition method and a general panel-panel multiplication (GEPP)/GEBP partition method.

As illustrated in FIG. 1A, a GEPM method partitions an lhs matrix into multiple slices, each slice is further partitioned to multiple blocks with a dimension of [mc, kc]. The processing scan order of the GEPM method is a raster scan order at a horizontal direction, where each slice is processed from top to bottom and each block within one slice is read from main memory from left to right. In order to generate the full result of matrix multiplication, an rhs matrix needs to be read from the main memory a number-of-slice times.

A GEPP method partition an lhs matrix into multiple tiles, each tile is further partitioned to multiple blocks with a dimension of [mc, kc]. The processing scan order of the GEPP method is a raster scan order at a vertical direction, where each tile is processed from left to right and each block within one slice is read from main memory from top to bottom. In order to generate the full result of matrix multiplication, a result matrix needs to be read from main memory a number-of-tile-1 times, and also needs to be written to the main memory a number-of-tile times.

Figure 1B:
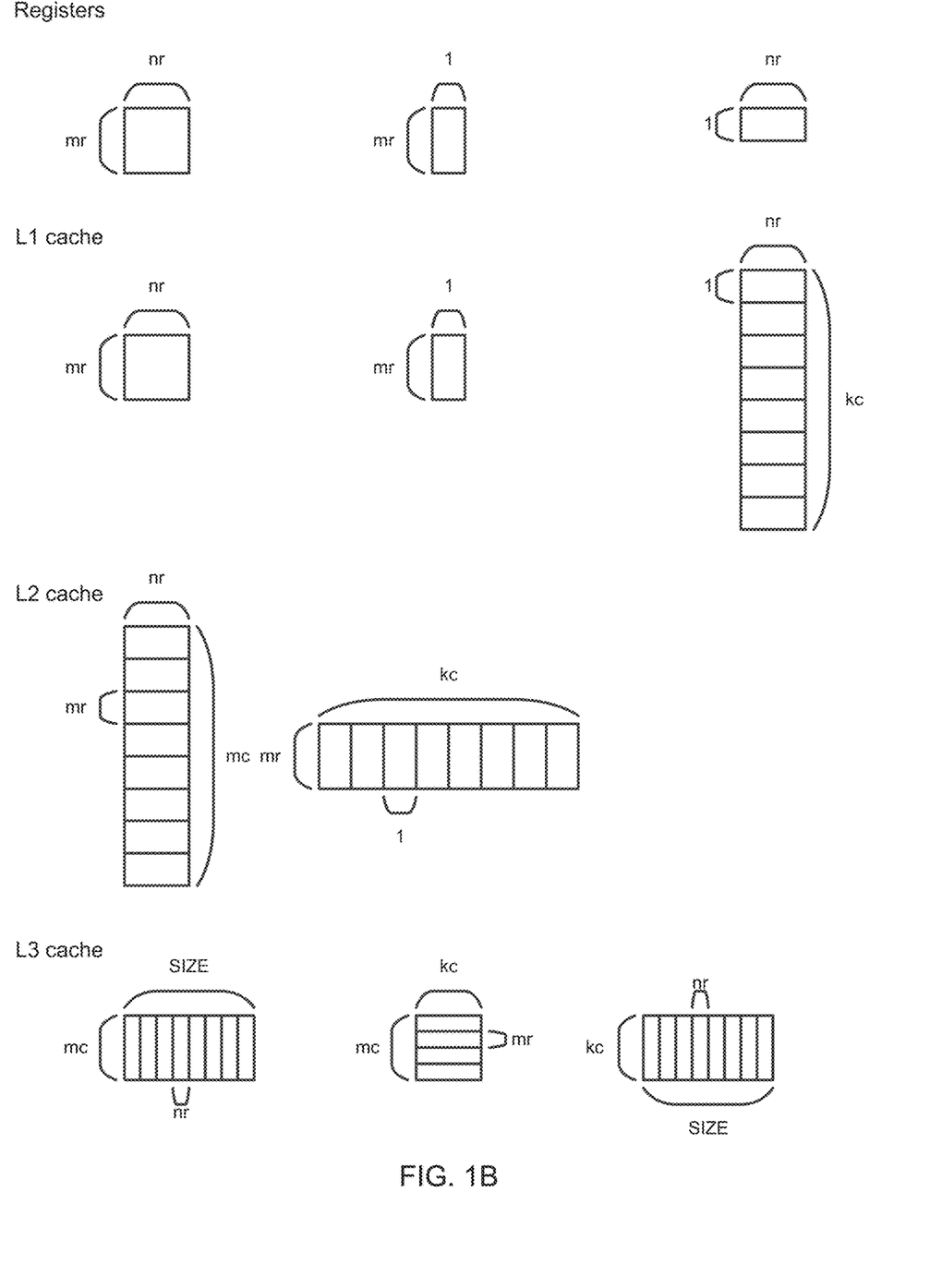
FIG. 1B is a diagram of another GEPM/GEBP partition method and another GEPP/GEBP partition method.

As illustrated in FIG. 1B, additional partitioning is preformed after the block of an lhs matrix [mc, kc] and a slice of an rhs matrix [kc, SIZE] is read from main memory to a computer processing unit (CPU) cache.

An [mc, kc] lhs block is further partitioned to multiple [mr, kc] blocks and then to multiple [mr, 1] blocks; a [kc, SIZE] rhs block is further partitioned to multiple [kc, nr] blocks and then to multiple [1, nr] blocks. An [mr, 1] lhs block and an [1, nr] rhs block is finally loaded to a CPU register, and an [mr, nr] result block is calculated using CPU medial access control (MAC) units and stored in a register before it is unloaded to a CPU cache.

This process repeats until all coefficients in the lhs block and the rhs block is processed and an [mc, SIZE] result block is generated and written to main memory. After that, the next lhs and rhs blocks are loaded to the CPU cache for processing.

Active research has been conducted in the past years to compress large DNN models. The overall target is to reduce the size of the model (i.e., the required storage) and to accelerate inference, without sacrificing the performance of the original task (e.g., classification accuracy) much. Effective solutions usually require multidisciplinary knowledge from machine learning, computer architecture, hardware design, etc., and great progress has been made using different techniques, including weight pruning, weight quantization, low-rank factorization, and knowledge distillation.

Among all the efforts, weight pruning and weight quantization are the most popular directions. Weight pruning aims at removing unimportant weight coefficients and reducing the redundancy in the network connections.

From the partitioning procedure of a GEMM operation, the main/cache memory access and matrix multiplication operation can be skipped only when coefficient values of the whole block or sub-block are zero. Although a high compression rate can be achieved with little prediction loss, unstructured weight pruning methods cannot improve inference computation (sometimes even worsen the problem) most of the time, due to the random memory access caused by the unstructured sparsity in the pruned weight matrices.

Furthermore, removing large percentage of weights usually causes a large prediction performance drop.

Weight pruning method aim to change more coefficients to a value of zero so that the block/sub-block of matrix multiplication can be skipped during a GEMM operation.

A uniform pattern based GEMM operation method is proposed to achieve the similar multiplication skipping result. A neural network retraining procedure is performed so that various predefined uniform patterns are produced. A pruning method is treated as a special case of the uniform pattern where the coefficient values of the uniform pattern are zero, in this case the multiplication can be skipping completely for this pattern. When the coefficient values of the uniform pattern are not zero, the multiplication cannot be skipping completely for this pattern, but the multiplication results can be shared within the block, result in a fewer number of multiplication operations.

Figure 2:
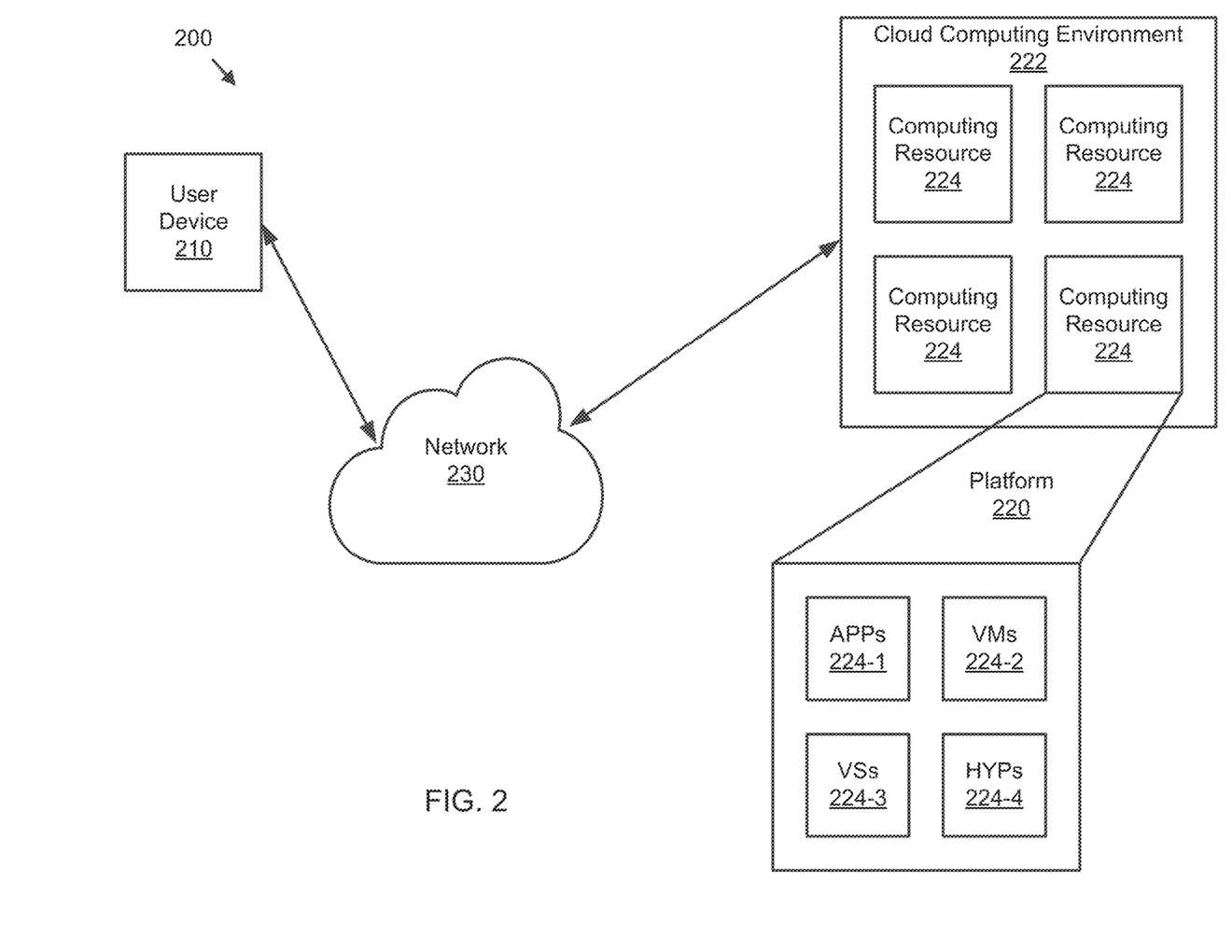
FIG. 2 is a diagram of an environment in which methods, apparatuses and systems described herein may be implemented, according to embodiments.

FIG. 2 is a diagram of an environment 200 in which methods, apparatuses and systems described herein may be implemented, according to embodiments. As shown in FIG. 2, the environment 200 may include a user device 210, a platform 220, and a network 230. Devices of the environment 200 may interconnect via wired connections, wireless connections, or a combination of wired and wireless connections.

The user device 210 includes one or more devices capable of receiving, generating, storing, processing, and/or providing information associated with platform 220. For example, the user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 210 may receive information from and/or transmit information to the platform 220.

The platform 220 includes one or more devices as described elsewhere herein. In some implementations, the platform 220 may include a cloud server or a group of cloud servers. In some implementations, the platform 220 may be designed to be modular such that software components may be swapped in or out. As such, the platform 220 may be easily and/or quickly reconfigured for different uses.

In some implementations, as shown, the platform 220 may be hosted in a cloud computing environment 222. Notably, while implementations described herein describe the platform 220 as being hosted in the cloud computing environment 222, in some implementations, the platform 220 may not be cloud-based (i.e., may be implemented outside of a cloud computing environment) or may be partially cloud-based.

The cloud computing environment 222 includes an environment that hosts the platform 220. The cloud computing environment 222 may provide computation, software, data access, storage, etc. services that do not require end-user (e.g., the user device 210) knowledge of a physical location and configuration of system(s) and/or device(s) that hosts the platform 220. As shown, the cloud computing environment 222 may include a group of computing resources 224 (referred to collectively as "computing resources 224" and individually as "computing resource 224").

The computing resource 224 includes one or more personal computers, workstation computers, server devices, or other types of computation and/or communication devices. In some implementations, the computing resource 224 may host the platform 220. The cloud resources may include compute instances executing in the computing resource 224, storage devices provided in the computing resource 224, data transfer devices provided by the computing resource 224, etc. In some implementations, the computing resource 224 may communicate with other computing resources 224 via wired connections, wireless connections, or a combination of wired and wireless connections.

As further shown in FIG. 2, the computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

The application 224-1 includes one or more software applications that may be provided to or accessed by the user device 210 and/or the platform 220. The application 224-1 may eliminate a need to install and execute the software applications on the user device 210. For example, the application 224-1 may include software associated with the platform 220 and/or any other software capable of being provided via the cloud computing environment 222. In some implementations, one application 224-1 may send/receive information to/from one or more other applications 224-1, via the virtual machine 224-2.

The virtual machine 224-2 includes a software implementation of a machine (e.g., a computer) that executes programs like a physical machine. The virtual machine 224-2 may be either a system virtual machine or a process virtual machine, depending upon use and degree of correspondence to any real machine by the virtual machine 224-2. A system virtual machine may provide a complete system platform that supports execution of a complete operating system ("OS"). A process virtual machine may execute a single program, and may support a single process. In some implementations, the virtual machine 224-2 may execute on behalf of a user (e.g., the user device 210), and may manage infrastructure of the cloud computing environment 222, such as data management, synchronization, or long-duration data transfers.

The virtualized storage 224-3 includes one or more storage systems and/or one or more devices that use virtualization techniques within the storage systems or devices of the computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 224-4 may provide hardware virtualization techniques that allow multiple operating systems (e.g., "guest operating systems") to execute concurrently on a host computer, such as the computing resource 224. The hypervisor 224-4 may present a virtual operating platform to the guest operating systems, and may manage the execution of the guest operating systems. Multiple instances of a variety of operating systems may share virtualized hardware resources.

The network 230 includes one or more wired and/or wireless networks. For example, the network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
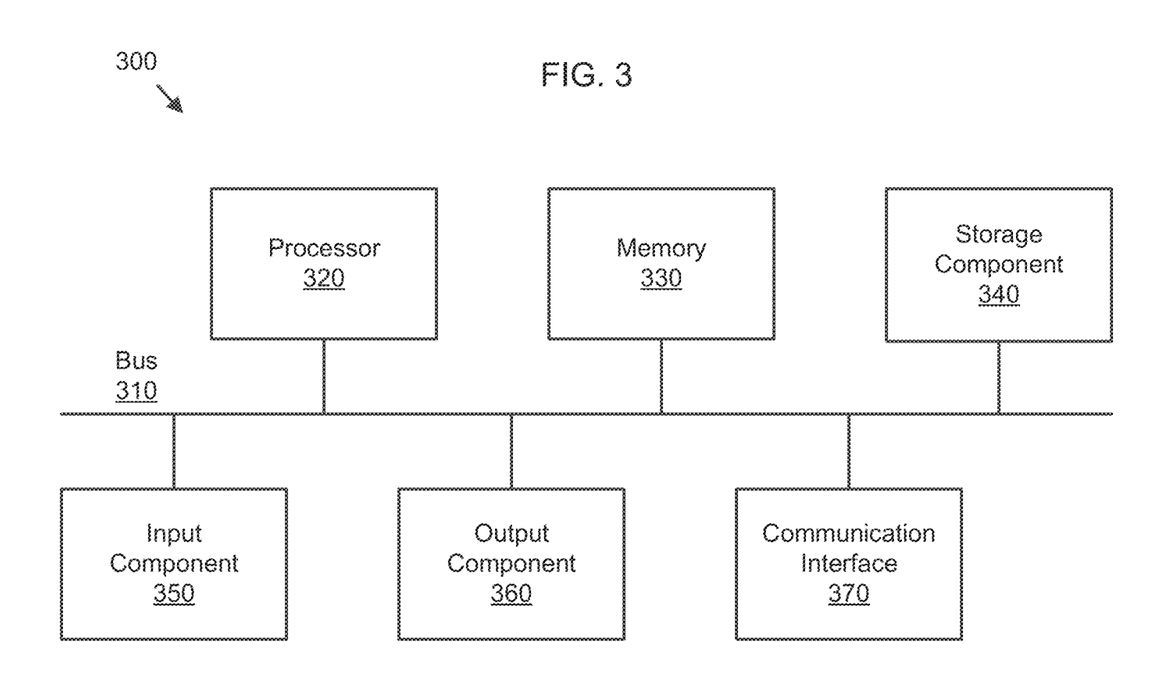
FIG. 3 is a block diagram of example components of one or more devices of FIG. 2.

FIG. 3 is a block diagram of example components of one or more devices of FIG. 2. The device 300 may correspond to the user device 210 and/or the platform 220. As shown in FIG. 3, device 300 may include a bus 310, a processor 320, a memory 330, a storage component 340, an input component 350, an output component 360, and a communication interface 370.

The bus 310 includes a component that permits communication among the components of the device 300. The processor 320 is implemented in hardware, firmware, or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 320 includes one or more processors capable of being programmed to perform a function. The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 includes a component that provides output information from the device 300 (e.g., a display, a speaker, and/or one or more light-emitting diodes (LEDs)).

The communication interface 370 includes a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform these processes in response to the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Methods and apparatuses for NNMM will now be described in detail.

As illustrated in FIG. 1B, the smallest matrix partition in GEMM operation are [mr, 1] for an lhs block and [1, nr] for an rhs block, mr times nr multiplication can be performed using generic MAC units or dedicated single instructions, multiple data (SIMD) units.

In embodiments, the smallest matrix partition is [mr, p] for an lhs block and [p, nr] for an rhs block. Mr, nr, p can be adjusted arbitrarily, and a uniform pattern can be defined for every combination of mr, nr and p. The pattern can be defined in such way that the total number of multiplication and addition is within the capacity of generic MAC units or dedicated SIMD units.

In general 2D matrix multiplication of [mr, nr]=[mr, p]×[p, nr], p number of multiplication operations are required to generate one output:

$$O[j, i] = \sum_{pp=0}^{p-1} lhs[j, pp] * rhs[pp, i], \quad (1)$$

where $j = [0, mr - 1], i = [0, nr - 1]$

However, if n number of coefficients in one lhs matrix row share the same value, these coefficients can share one multiplication result so that n-1 multiplication operations can be skipped. For example, without loss of generality, if first n coefficients in one lhs matrix row are identical, the below formula can be used to generate output so that n multiplication operations are consolidated to one multiplication operation:

$$O[j, i] = lhs[j, p1] * \sum_{p1=0}^{n-1} rhs[p1, i] + \sum_{p2=n}^{p-1} lhs[j, p2] * rhs[p2, i], \quad (2)$$

where $j = [0, mr - 1], i = [0, nr - 1]$

If n number of coefficients in one lhs matrix row share the same absolute value, these coefficients can also share one multiplication result so that n-1 multiplication operations can be skipped. For example, if the absolute value of first n coefficients in one lhs matrix row are identical, the below formula can be used to generate output so that n multiplication operations are consolidated to one multiplication operation:

$$O[j, i] = \qquad (3)$$
$$abs(lhs[j, p1]) * \sum_{p1=0}^{n-1} (sign(lhs[j, p1])? -rhs[p1, i] : rhs[p1, i]) +$$
$$\sum_{p2=n}^{p-1} lhs[j, p2] * rhs[p2, i],$$

where $j = [0, mr - 1], i = [0, nr - 1]$

Several row or column reorder operations are defined based on the nature of matrix multiplication:

1) The calculation of O[j1, i] can be skipped entirely (O[j1, i]=O[j0, i]) if lhs matrix row j0 and row j1 are identical.

2) If multiple rows in an lhs matrix are swapped or reordered, the corresponding rows in output is swapped or reordered as well. Multiple rows can be swapped or reordered if more uniform pattern can be found after this operation.

If multiple columns in an lhs matrix are swapped or reordered and the corresponding rows in an rhs matrix are swapped or reordered too, the output is unchanged. Multiple rows can be swapped or reordered in the lhs matrix and multiple columns can be swamped or reordered in rhs matrix, if a more uniform pattern can be found after this operation.

4) Similar properties can be applied to an rhs matrix block.

To illustrate the uniform patterns, [4, 4]×[4, 4], [4, 2]×[2, 4], [4, 1]×[1, 4] and [2, 2]×[2, 2] may be used as examples; other matrix shape combinations and uniform patterns can be defined using the same principle.

As illustrated below, a general [4, 4]×[4, 4] matrix multiplication uses 64 multipliers and 48 adders.

TABLE 1-3

| x(0, 0) | x(0, 1) | x(0, 2) | x(0, 3) | | y(0, 0) | y(0, 1) | y(0, 2) | y(0, 3) | |
|---|---|---|---|---|---|---|---|---|---|
| x(1, 0) | x(1, 1) | x(1, 2) | x(1, 3) | x | y(1, 0) | y(1, 1) | y(1, 2) | y(1, 3) | = |
| x(2, 0) | x(2, 1) | x(2, 2) | x(2, 3) | | y(2, 0) | y(2, 1) | y(2, 2) | y(2, 3) | |
| x(3, 0) | x(3, 1) | x(3, 2) | x(3, 3) | | y(3, 0) | y(3, 1) | y(3, 2) | y(3, 3) | |
| x(0, 0)*y(0, 0) + x(0, 1)* y(1, 0) + | x(0, 0)*y(0, 1) + x(0, 1)* y(1, 1) + | | | | x(0, 0)*y(0, 2) + x(0, 1)* y(1, 2) + | | x(0, 0)*y(0, 3) + x(0, 1)* y(1, 3) + | | |
| x(0, 2)*y(2, 0) + x(0, 3)* y(3, 0) | x(0, 2)*y(2, 1) + x(0, 3)* y(3, 1) | | | | x(0, 2)*y(2, 2) + x(0, 3)* y(3, 2) | | x(0, 2)*y(2, 3) + x(0, 3)* y(3, 3) | | |
| x(1, 0)*y(0, 0) + x(1, 1)* y(1, 0) + | x(1, 0)*y(0, 1) + x(1, 1)* y(1, 1) + | | | | x(1, 0)*y(0, 2) + x(1, 1)* y(1, 2) + | | x(1, 0)*y(0, 3) + x(1, 1)* y(1, 3) + | | |
| x(1, 2)*y(2, 0) + x(1, 3)* y(3, 0) | x(1, 2)*y(2, 1) + x(1, 3)* y(3, 1) | | | | x(1, 2)*y(2, 2) + x(1, 3)* y(3, 2) | | x(1, 2)*y(2, 3) + x(1, 3)* y(3, 3) | | |
| x(2, 0)*y(0, 0) + x(2, 1)* y(1, 0) + | x(2, 0)*y(0, 1) + x(2, 1)* y(1, 1) + | | | | x(2, 0)*y(0, 2) + x(2, 1)* y(1, 2) + | | x(2, 0)*y(0, 3) + x(2, 1)* y(1, 3) + | | |
| x(2, 2)*y(2, 0) + x(2, 3)* y(3, 0) | x(2, 2)*y(2, 1) + x(2, 3)* y(3, 1) | | | | x(2, 2)*y(2, 2) + x(2, 3)* y(3, 2) | | x(2, 2)*y(2, 3) + x(2, 3)* y(3, 3) | | |

TABLE 1-3-continued

| x(3, 0)*y(0, 0) + x(3, 1)* y(1, 0) + x(3, 2)*y(2, 0) + x(3, 3)* y(3, 0) | x(3, 0)*y(0, 1) + x(3, 1)* y(1, 1) + x(3, 2)*y(2, 1) + x(3, 3)* y(3, 1) | x(3, 0)*y(0, 2) + x(3, 1)* y(1, 2) + x(3, 2)*y(2, 2) + x(3, 3)* y(3, 2) | x(3, 0)*y(0, 3) + x(3, 1)* y(1, 3) + x(3, 2)*y(2, 3) + x(3, 3)* y(3, 3) |
|---|---|---|---|

A fewer number of multiplication and addition operations are achieved if a uniform pattern is used to represent an lhs block. Several uniform patterns for a [4, 4] lhs block and the corresponding number of shared multipliers and adders are listed below as examples. A, b, c, d are unquantized floating point values or quantized integer values.

TABLE 4

| # multiplier | # adder | Uniform pattern |
|---|---|---|
| 4 | 12 | a a a a<br>a a a a<br>a a a a<br>a a a a |
| 8 | 12 | a a a b a a a b a a a b a a a<br>a a a b a a a b a a a b a a a<br>a a a b a a a b a a a b a a a<br>a a a b a a a b a a a b a a a<br>a a b b a b b a a b a b<br>a a b b a b b a a b a b<br>a a b b a b b a a b a b<br>a a b b a b b a a b a b<br>a a a a a a a a a b b b b<br>a a a a a a b b b b a a a a<br>a a a a b b b b a a a a a a<br>b b b b a a a a a a a a a a<br>a a a a a a a a a a<br>a a a a b b b b b b b b<br>b b b b b b b b a a a a<br>b b b b a a a a b b b b |
| 12 | 12 | a a b c a b a c a b c a b a c a<br>a a b c a b a c a b c a b a c a<br>a a b c a b a c a b c a b a c a<br>a a b c a b a c a b c a b a c a<br>b c a a<br>b c a a<br>b c a a<br>b c a a<br>a a a a a a a a a a a b b b b<br>a a a a b b b b b b b b a a a a<br>b b b b a a a a c c c c c c c c<br>c c c c c c c c a a a a a a a a<br>b b b b<br>c c c c<br>a a a a<br>a a a a |
| 16 | 12 | a a a a a b c d<br>b b b b a b c d<br>c c c c a b c d<br>d d d d a b c d |
| 16 | 16 | a a b b c c d d a a b b<br>a a b b a a b b c c d d<br>c c d d a a b b a a b b<br>c c d d c c d d c c d d<br>b a a b a b a b<br>b a a b a b a b<br>d c c d c d c d<br>d c c d c d c d<br>a b c c a b d d a b c c<br>a b c c a b c c a b d d<br>a b d d a b c c a b c c<br>a b d d a b d d a b d d<br>a c c b a d b a c c b<br>a c c b a c c b a d d b<br>a d d b a c c b a c c b<br>a d d b a d d b a d d b |

TABLE 4-continued

| c c a b d d a b c c a b |
| c c a b c c a b d d a b |
| d d a b c c a b c c a b |
| d d a b d d a b d d a b |
| a c b c a d b d a c b c |
| a c b c a c b c a d b d |
| a d b d a c b c a c b c |
| a d b d a d b d a d b d |
| c a b c d a b d c a b c |
| c a b c c a b c d a b d |
| d a b d c a b c c a b c |
| d a b d d a b d d a b d |
| c a c b d a d b c a c b |
| c a c b c a c b d a d b |
| d a d b c a c b c a c b |
| d a d b d a d b d a d b |
| a a a a a a a a a a a a |
| b b b b b b b b b b b b |
| c c d d c c d c d c d |
| c c d d c c d c d c d |
| a a a a a a a a a a a a |
| c c d d c c d c d c d |
| c c d d c c d c d c d |
| b b b b b b b b b b b b |
| c c d d c c d c d c d |
| c c d d c c d c d c d |
| a a a a a a a a a a a a |
| b b b b b b b b b b b b |
| a a a a a a a a a a a a |
| c c d d c c d c d c d |
| b b b b b b b b b b b b |
| c c d d c c d c d c d |
| c c d d c c d c d c d |
| a a a a a a a a a a a a |
| b b b b b b b b b b b b |
| c c d d c c d c d c d |
| c c d d c c d c d c d |
| a a a a a a a a a a a a |
| c c d d c c d c d c d |
| b b b b b b b b b b b b |

Instead of using 64 multipliers for a general [4, 4]×[4, 4] matrix multiplication, only 4, 8, 16 multipliers are used by utilizing a different uniform pattern for a [4, 4] lhs matrix block.

As illustrated below, a general [4, 2]×[2, 4] matrix multiplication uses 32 multipliers and 16 adders.

TABLES 5-7

| x(0, 0) | x(0, 1) | | y(0, 0) | y(0, 1) | y(0, 2) | y(0, 3) | x(0, 0)*y(0, 0) +x(0, 0)*y(0, 1) +x(0, 0)*y(0, 2) +x(0, 0)*y(0, 3) + |
| --- | --- | --- | --- | --- | --- | --- | --- |
| | | | | | | | x(0, 1)*y(1, 0)    x(0, 1)*y(1, 1)    x(0, 1)*y(1, 2)    x(0, 1)*y(1, 3) |
| x(1, 0) | x(1, 1) | X | y(1, 0) | y(1, 1) | y(1, 2) | y(1, 3) | x(1, 0)*y(0, 0) +x(1, 0)*y(0, 1) +x(1, 0)*y(0, 2) +x(1, 0)*y(0, 3) + |
| | | | | | | | x(1, 1)*y(1, 0)    x(1, 1)*y(1, 1)    x(1, 1)*y(1, 2)    x(1, 1)*y(1, 3) |
| x(2, 0) | x(2, 1) | | | | | | x(2, 0)*y(0, 0) +x(2, 0)*y(0, 1) +x(2, 0)*y(0, 2) +x(2, 0)*y(0, 3) + |
| | | | | | | | x(2, 1)*y(1, 0)    x(2, 1)*y(1, 1)    x(2, 1)*y(1, 2)    x(2, 1)*y(1, 3) |
| x(3, 0) | x(3, 1) | | | | | | x(3, 0)*y(0, 0) +x(3, 0)*y(0, 1) +x(3, 0)*y(0, 2) +x(3, 0)*y(0, 3) + |
| | | | | | | | x(3, 1)*y(1, 0)    x(3, 1)*y(1, 1)    x(3, 1)*y(1, 2)    x(3, 1)*y(1, 3) |

A fewer number of multiplication and addition operations are achieved if a uniform pattern is used to represent an lhs block. Several uniform patterns for a [4, 2] lhs block and the corresponding number of shared multipliers and adders are listed below as examples. A, b, c, d are unquantized floating point values or quantized integer values.

TABLE 8

| # multiplier | # adder | Uniform pattern | | | | | |
| --- | --- | --- | --- | --- | --- | --- | --- |
| 4 | 8 | | | a | a | | |
| | | | | a | a | | |
| | | | | a | a | | |
| | | | | a | a | | |
| 8 | 4 | a | b | | | | |
| | | a | b | | | | |
| | | a | b | | | | |
| | | a | b | | | | |
| | | a | a | c | c | a | a |
| | | a | a | a | a | c | c |
| | | c | c | a | a | a | a |
| | | c | c | c | c | c | c |
| 12 | 4 | a | a | a | a | c | c |
| | | b | b | c | c | c | c |
| | | c | c | c | c | a | a |
| | | c | c | b | b | b | b |
| | | a | a | c | c | c | c |
| | | c | c | a | a | a | a |
| | | b | b | b | b | c | c |
| | | c | c | c | c | b | b |
| 12 | 8 | a | b | a | c | a | b |
| | | a | b | a | b | a | c |
| | | a | c | a | b | a | b |
| | | a | c | a | c | a | c |
| | | b | a | c | a | b | a |
| | | b | a | b | a | c | a |
| | | c | a | b | a | b | a |
| | | c | a | c | a | c | a |
| 16 | 4 | | | a | a | | |
| | | | | b | b | | |
| | | | | c | c | | |
| | | | | d | d | | |

Instead of using 32 multipliers for a general [4, 2]×[2, 4] matrix multiplication, only 4, 8, 12, 16 multipliers are used by utilizing different uniform patterns for a [4, 2] lhs matrix block.

As illustrated below, a general [4, 1]×[1, 4] matrix multiplication uses 16 multipliers.

TABLES 9-11

| x(0, 0) | | | | | | | x(0, 0)*y(0, 0) | x(0, 0)*y(0, 1) | x(0, 0)*y(0, 2) | x(0, 0)*y(0, 3) |
| --- | --- | --- | --- | --- | --- | --- | --- | --- | --- | --- |
| x(1, 0) | x | y(0, 0) | y(1, 0) | y(2, 0) | y(3, 0) | = | x(1, 0)*y(0, 0) | x(1, 0)*y(0, 1) | x(1, 0)*y(0, 2) | x(1, 0)*y(0, 3) |
| x(2, 0) | | | | | | | x(2, 0)*y(0, 0) | x(2, 0)*y(0, 1) | x(2, 0)*y(0, 2) | x(2, 0)*y(0, 3) |
| x(3, 0) | | | | | | | x(3, 0)*y(0, 0) | x(3, 0)*y(0, 1) | x(3, 0)*y(0, 2) | x(3, 0)*y(0, 3) |

A fewer number of multiplication and addition operations are achieved if a uniform pattern is used to represent an lhs block. Several uniform pattern for a [4, 1] lhs block and the corresponding number of shared multipliers are listed below as examples. A, b, c are unquantized floating point values or quantized integer values.

TABLE 12

| # multiplier | Uniform pattern | | | |
|---|---|---|---|---|
| 4 | a | | | |
|   | a | | | |
|   | a | | | |
|   | a | | | |
| 8 | a | a | a | c |
|   | a | a | c | a |
|   | a | c | a | a |
|   | c | a | a | a |
|   | a | c | a | |
|   | a | a | c | |
|   | c | a | a | |
|   | c | c | c | |
| 12 | a | a | c | |
|   | b | c | c | |
|   | c | c | a | |
|   | c | b | b | |
|   | a | c | c | |
|   | c | a | a | |
|   | b | b | c | |
|   | c | c | b | |

Instead of using 16 multipliers for a general [4, 1]×[1, 4] matrix multiplication, 4, 8, 12 multipliers are only used by utilizing different uniform patterns for a [4, 1] lhs matrix block.

As illustrated below, a general [2, 2]×[2, 2] matrix multiplication uses 8 multipliers and 4 adders.

TABLE 13-15

| x(0, 0) | x(0, 1) | y(0, 0) | y(0, 1) | x(0, 0)*y(0, 0), x(0, 1)*y(1, 0) | x(0, 0)*y(0, 1) + x(0, 1)*y(1, 1) |
| x(1, 0) | x(1, 1) | y(1, 0) | y(1, 1) | x(1, 0)*y(0, 0), x(1, 1)*y(1, 0) | x(1, 0)*y(0, 1) + x(1, 1)*y(1, 1) |

Fewer number of multiplication and addition operations are achieved if a uniform pattern is used to represent an lhs block. Several uniform patterns for a [2, 2] lhs block and the corresponding number of shared multipliers and adders are listed below as an example. A, b, c, d are unquantized floating point values or quantized integer values.

TABLE 16

| # multiplier | # adder | Uniform pattern | |
|---|---|---|---|
| 2 | 2 | a | a |
|   |   | a | a |
| 4 | 2 | a | b |
|   |   | a | b |
|   |   | a | a |
|   |   | b | b |

Instead of using 8 multipliers for a general [2, 2]×[2, 2] matrix multiplication, only 2, 4 multipliers are used by utilizing different uniform patterns for a [2, 2] lhs matrix block.

A convolution layer is usually a 4D tensor with a shape of [R] [S] [K] [C], where R/S is a convolution kernel size, C is an input feature size and K is an output feature size. Convolution calculation usually reshapes the 4D tensor [R] [S] [K] [C] to a 2D tensor [K] [CRS] where each kernel [R] [S] is stored in continuous memory. If a uniform pattern is applied to this layout, most if not all kernel coefficients are modified to the same uniform pattern, resulting in an unrecoverable large neural network performance drop even after a retrain process.

In order to generate more uniform patterns and maintain neural network performance after the retrain process, a 2D [R] [S] dimension is reshaped to an 1D [RS] dimension so that the 4D tensor [R] [S] [K] [C] is reshaped to the 3D tensor [RS] [K] [C]. The uniform pattern exploration space is mainly on a [K] [C] 2D plane. An optional uniform pattern exploration operation can still be applied to an [RS] axis.

Figure 4:
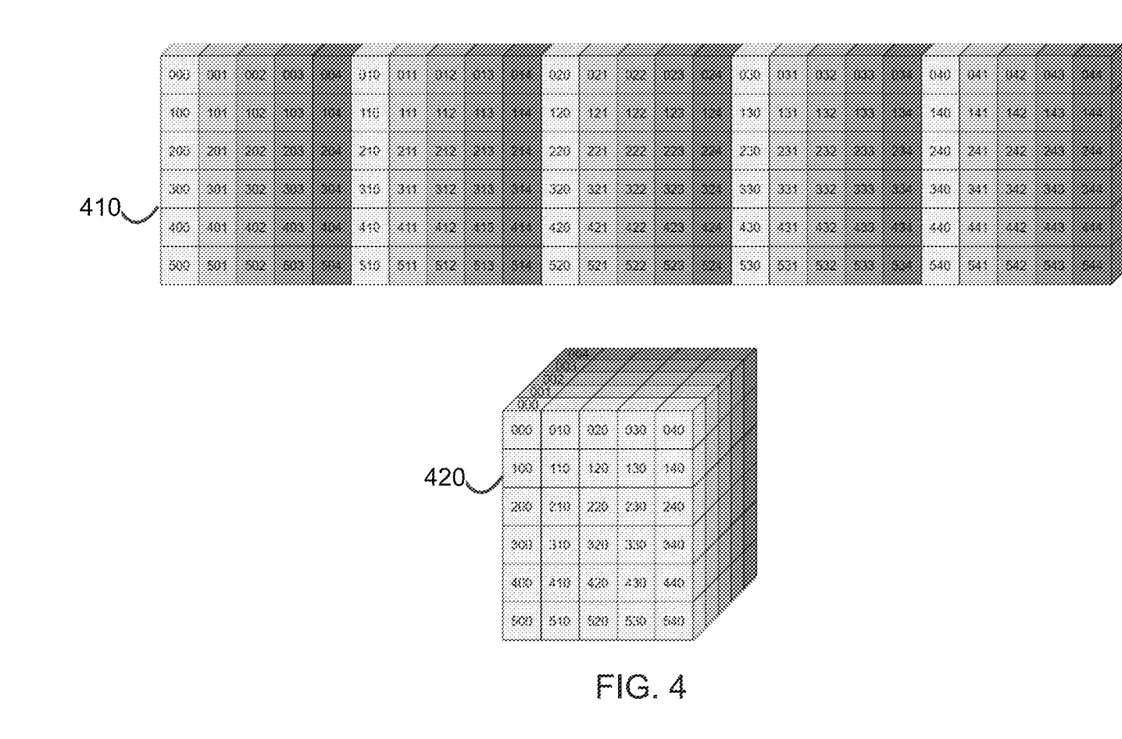
FIG. 4 is diagram of a 2D tensor layout and a 3D tensor layout of a convolution layer, according to embodiments.
Figure 5:
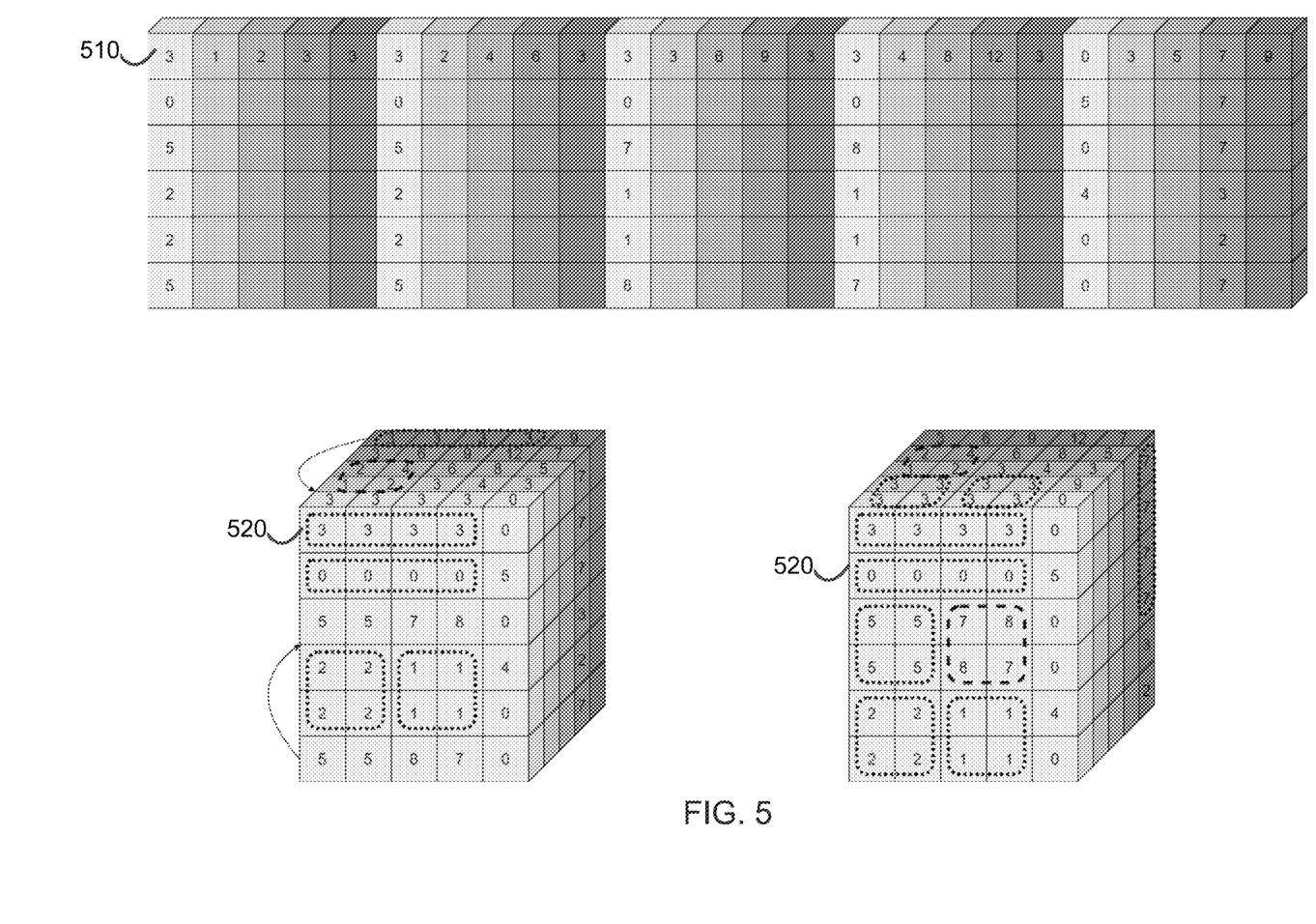
FIG. 5 is diagram of a uniform pattern using a 2D sensor layout and a 3D tensor layer of a convolution layer, according to embodiments.

FIG. 4 illustrates a 2D tensor layout 410 used in a general convolution operation and a proposed 3D tensor layout 420. FIG. 5 illustrates an example of a uniform pattern using a 2D tensor layout 510 and a 3D tensor layout 520. As can be seen from the examples, more uniform patterns can be explored using the 3D layout.

In an embodiment, two or more 2D planes along an RS axis is reordered in order to generate more uniform patterns. In another embodiment, no 2D plane reorder operation is allowed during the process.

In embodiments a NNMM routine is proposed, i.e., an uniform pattern based GEMM3D method for a neural network matrix-matrix multiplication routine.

Additional partitioning is preformed after the block of an lhs matrix [mc, kc] and a slice of an rhs matrix [kc, SIZE] is read from main memory to a CPU cache.

Figure 6:
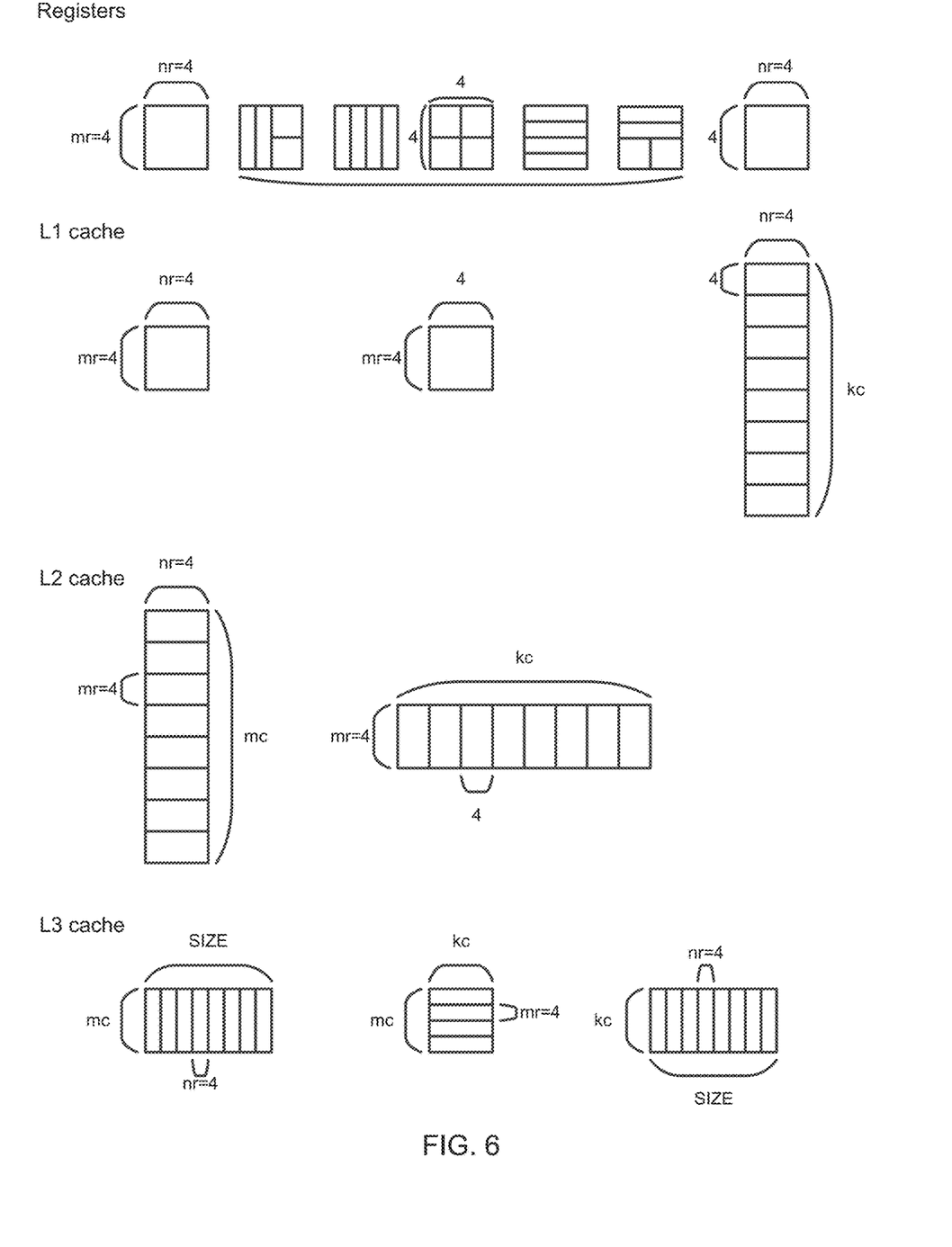
FIG. 6 is a diagram of a uniform pattern based, three-dimensional general matrix-matrix multiplication (GEMM3D) partition.

As illustrated in FIG. 6, an [mc, kc] lhs block is partitioned using an uniform pattern based approach, in which the [mc, kc] lhs block is partitioned to multiple [mr, kc] blocks and then to multiple [mr, p] blocks, and a [kc, SIZE] rhs block is partitioned to multiple [kc, nr] blocks and then to multiple [p, nr] blocks. In this example, each of mr, nr and p is equal to 4.

Different matrix multiplication routines are defined to process different uniform patterns of an [mr, p] lhs block. Depending on the requirement of the specific matrix multiplication routine, not all coefficients in an [mr, p] lhs block need to be loaded to a CPU register.

To generate an [mr, nr] result block, the required coefficients in an [mr, p] lhs block and a [p, nr] rhs block is loaded to a CPU register, and the [mr, nr] result block is calculated using the specific matrix multiplication routine. The [mr, nr] result block is stored in a register before it is unloaded to a CPU cache.

This process repeats until all coefficients in an lhs block and an rhs block is processed and an [mc, SIZE] result block is generated and written to main memory. After that, the next lhs and rhs blocks are loaded to the CPU cache for processing.

In an embodiment, two or more rows in an lhs matrix block is reordered in order to generate more uniform patterns. In another embodiment, no row reorder operation is allowed when processing an lhs matrix block.

In an embodiment, two or more columns in an rhs matrix block is reordered in order to generate more uniform patterns. In another embodiment, no column reorder operation is allowed when processing the rhs matrix block.

In an embodiment, only one uniform pattern is allowed for lhs matrix blocks. In another embodiment, two or more uniform patterns can be used for lhs matrix blocks.

Figure 7:
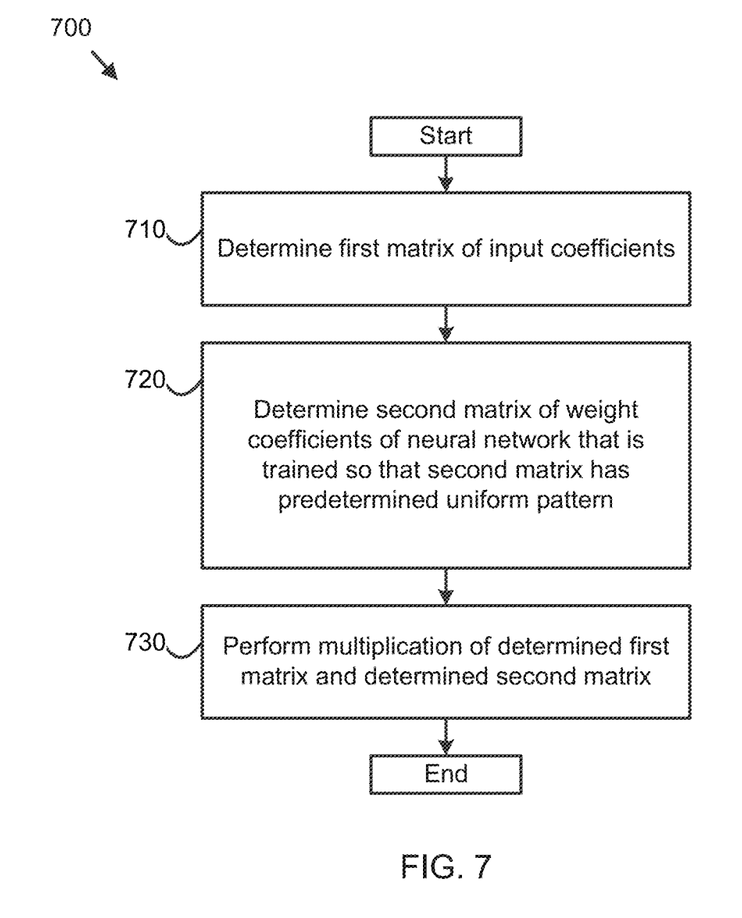
FIG. 7 is a flowchart of a method of NNMM, according to embodiments.

FIG. 7 is a flowchart of a method 700 of NNMM, according to embodiments. In some implementations, one or more process blocks of FIG. 7 may be performed by the platform 220. In some implementations, one or more process blocks of FIG. 7 may be performed by another device or a group of devices separate from or including the platform 220, such as the user device 210.

As shown in FIG. 7, in operation 710, the method 700 includes determining a first matrix of input coefficients.

In operation 720, the method 700 includes determining a second matrix of weight coefficients of a neural network that is trained so that the second matrix has a predetermined uniform pattern, the predetermined uniform pattern having at least two of the weight coefficients that have a same value.

In operation 730, the method 700 includes performing multiplication of the determined first matrix and the determined second matrix to determine output coefficients.

The second matrix may be partitioned into partitions, and the predetermined uniform pattern may have each of the partitions having respective ones of the weight coefficients that have a same value.

The neural network may be trained so that the second matrix has the predetermined uniform pattern, after the partitions are swapped or reordered to increase a number of uniform patterns in the predetermined uniform pattern.

The second matrix may be partitioned into partitions, and the predetermined uniform pattern may have only one of the partitions having respective ones of the weight coefficients that have a same value.

The same value may be an absolute value or a non-absolute value. The same value may be an unquantized floating point value or a quantized integer value.

The weight coefficients may include a 4D tensor, and the neural network may be trained so that the second matrix has the predetermined uniform pattern, after the 4D tensor is reshaped to a 3D tensor.

The method may further include outputting the determined output coefficients.

Although FIG. 7 shows example blocks of the method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel.

Figure 8:
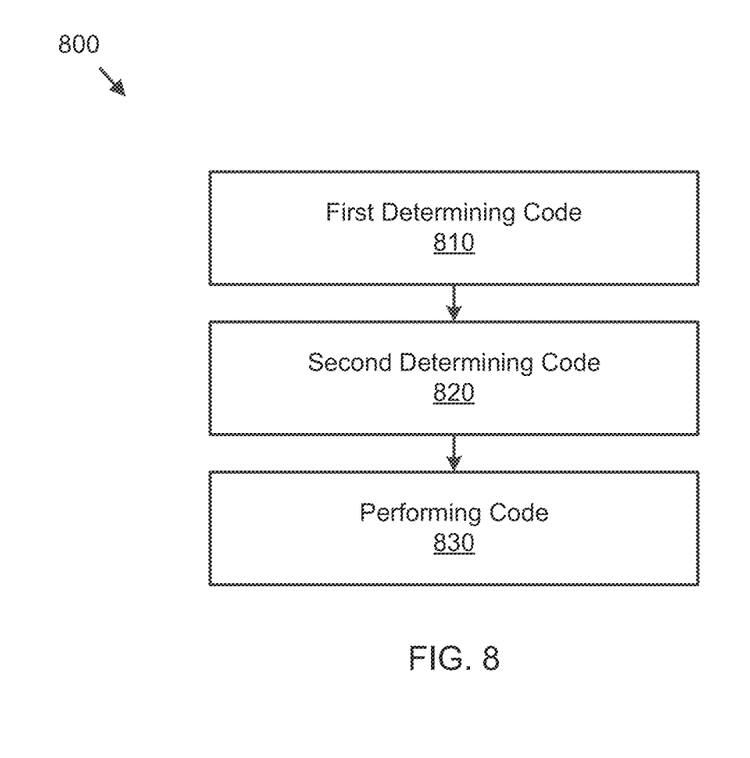
FIG. 8 is a block diagram of an apparatus for NNMM, according to embodiments.

FIG. 8 is a diagram of an apparatus 800 for NNMM, according to embodiments. As shown in FIG. 8, the apparatus 800 includes first determining code 810, second determining code 820 and performing code 830.

The first determining code 810 is configured to cause the at least one processor to determine a first matrix of input coefficients.

The second determining code 820 is configured to cause the at least one processor to determine a second matrix of weight coefficients of a neural network that is trained so that the second matrix has a predetermined uniform pattern, the predetermined uniform pattern having at least two of the weight coefficients that have a same value.

The performing code 830 is configured to cause the at least one processor to perform multiplication of the determined first matrix and the determined second matrix to determine output coefficients.

The second matrix may be partitioned into partitions, and the predetermined uniform pattern may have each of the partitions having respective ones of the weight coefficients that have a same value.

The neural network may be trained so that the second matrix has the predetermined uniform pattern, after the partitions are swapped or reordered to increase a number of uniform patterns in the predetermined uniform pattern.

The second matrix may be partitioned into partitions, and the predetermined uniform pattern may have only one of the partitions having respective ones of the weight coefficients that have a same value.

The same value may be an absolute value or a non-absolute value. The same value may be an unquantized floating point value or a quantized integer value.

The weight coefficients may include a four-dimensional (4D) tensor, and the neural network may be trained so that the second matrix has the predetermined uniform pattern, after the 4D tensor is reshaped to a three-dimensional (3D) tensor.

The apparatus 800 may further include outputting code configured to cause the at least one processor to output the determined output coefficients.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of neural network optimized matrix-matrix multiplication (NNMM) for reducing total computation operations performed by at least one processor, and the method comprising:
   determining a first matrix of input coefficients;
   determining a second matrix of weight coefficients of a neural network, wherein the neural network is trained to produce the second matrix having a predetermined uniform pattern, wherein the predetermined uniform pattern has at least two of the weight coefficients that have a same value;

wherein the second matrix is partitioned into partitions;

swapping partitions of the second matrix such that a number of uniform patterns in the second matrix increases after partitions are swapped and generating the swapped second matrix;

loading the first matrix of input coefficients into a register associated with the at least one processor;

loading the second matrix into the register associated with the at least one processor;

generating a result block by performing multiplication of the first matrix and the swapped second matrix using only a first number of computation operations performed by the at least one processor, wherein the first number of computation operations performed by the at least one processor are fewer than a second number of computation operations performed by the at least one processor when performing multiplication of the first matrix and the second matrix; and writing the result block into a main memory associated with the at least one processor.

2. The method of claim 1, wherein the predetermined uniform pattern has each of the partitions having respective ones of the weight coefficients that have a same value.

3. The method of claim 1, wherein the predetermined uniform pattern has only one of the partitions having respective ones of the weight coefficients that have a same value.

4. The method of claim 1, wherein the same value is an absolute value or a non-absolute value, and the same value is an unquantized floating point value or a quantized integer value.

5. The method of claim 1, wherein the weight coefficients comprise a four-dimensional (4D) tensor, and the neural network is trained so that the second matrix has the predetermined uniform pattern, after the 4D tensor is reshaped to a three-dimensional (3D) tensor.

6. The method of claim 1, further comprising outputting output coefficients based on the result block.

7. An apparatus for neural network optimized matrix-matrix multiplication (NNMM) for reducing total computation operations performed during matrix multiplication, the apparatus comprising:

at least one memory configured to store program code; and at least one processor configured to read the program code and operate as instructed by the program code, the program code comprising:

first determining code configured to cause the at least one processor to determine a first matrix of input coefficients;

second determining code configured to cause the at least one processor to determine a second matrix of weight coefficients of a neural network, wherein the neural network is trained to produce the second matrix having a predetermined uniform pattern, wherein the predetermined uniform pattern has at least two of the weight coefficients that have a same value, wherein the second matrix is partitioned into partitions;

swapping code configured to cause the at least one processor to swap partitions of the second matrix such that a number of uniform patterns in the second matrix increases after partitions are swapped and generating the swapped second matrix;

first loading code configured to cause the at least one processor to load the first matrix of input coefficients into a register associated with the at least one processor;

second loading code configured to cause the at least one processor to load the second matrix into the register associated with the at least one processor;

third generating code configured to cause the at least one processor to generate a result block by performing multiplication of the first matrix and the swapped second matrix using only a first number of computation operations performed by the at least one processor, wherein the first number of computation operations performed by the at least one processor are fewer than a second number of computation operations performed by the at least one processor when performing multiplication of the first matrix and the second matrix; and writing code configured to cause the at least one processor to write the result block into a main memory associated with the at least one processor.

8. The apparatus of claim 7, wherein the predetermined uniform pattern has each of the partitions having respective ones of the weight coefficients that have a same value.

9. The apparatus of claim 7, wherein the predetermined uniform pattern has only one of the partitions having respective ones of the weight coefficients that have a same value.

10. The apparatus of claim 7, wherein the same value is an absolute value or a non-absolute value, and the same value is an unquantized floating point value or a quantized integer value.

11. The apparatus of claim 7, wherein the weight coefficients comprise a four-dimensional (4D) tensor, and the neural network is trained so that the second matrix has the predetermined uniform pattern, after the 4D tensor is reshaped to a three-dimensional (3D) tensor.

12. The apparatus of claim 7, further comprising outputting code configured to cause the at least one processor to output coefficients based on the result block.

13. A non-transitory computer-readable medium storing instructions that, when executed by at least one processor for neural network optimized matrix-matrix multiplication (NNMM) for reducing total computation operations performed during matrix multiplication, cause the at least one processor to:

determine a first matrix of input coefficients;

determine a second matrix of weight coefficients of a neural network, wherein the neural network is trained to produce the second matrix having a predetermined uniform pattern, wherein the predetermined uniform pattern has at least two of the weight coefficients that have a same value;

wherein the second matrix is partitioned into partitions;

swap partitions of the second matrix such that a number of uniform patterns in the second matrix increases after partitions are swapped and generating the swapped second matrix;

load the first matrix of input coefficients into a register associated with the at least one processor;

load the second matrix into the register associated with the at least one processor;

generate a result block by performing multiplication of the first matrix and the swapped second matrix using only a first number of computation operations performed by the at least one processor, wherein the first number of computation operations performed by the at least one processor are fewer than a second number of computation operations performed by the at least one processor when performing multiplication of the first matrix and the second matrix; and write the result block into a main memory associated with the at least one processor.

14. The non-transitory computer-readable medium of claim 13, wherein the predetermined uniform pattern has each of the partitions having respective ones of the weight coefficients that have a same value.

15. The non-transitory computer-readable medium of claim 13, wherein the predetermined uniform pattern has only one of the partitions having respective ones of the weight coefficients that have a same value.

16. The non-transitory computer-readable medium of claim 13, wherein the same value is an absolute value or a non-absolute value, and the same value is an unquantized floating point value or a quantized integer value.

17. The non-transitory computer-readable medium of claim 13, wherein the weight coefficients comprise a four-dimensional (4D) tensor, and the neural network is trained so that the second matrix has the predetermined uniform pattern, after the 4D tensor is reshaped to a three-dimensional (3D) tensor.

\* \* \* \* \*